(12) United States Patent
Fujita

(10) Patent No.: US 9,282,476 B2
(45) Date of Patent: Mar. 8, 2016

(54) COMMUNICATION CONTROL SYSTEM, COMMUNICATION CONTROL DEVICE, AND COMMUNICATION CONTROL METHOD

(71) Applicant: FUJITSU LIMITED, Kawasaki-shi, Kanagawa (JP)

(72) Inventor: Takashi Fujita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 17 days.

(21) Appl. No.: 14/270,487

(22) Filed: May 6, 2014

(65) Prior Publication Data

US 2014/0349640 A1    Nov. 27, 2014

(30) Foreign Application Priority Data

May 23, 2013    (JP) .................................. 2013-109395

(51) Int. Cl.
  *H04W 24/00*    (2009.01)
  *H04W 24/04*    (2009.01)
  *H04M 1/24*    (2006.01)
  *H04W 88/02*    (2009.01)
  *H04W 88/08*    (2009.01)

(52) U.S. Cl.
  CPC ................ *H04W 24/04* (2013.01); *H04M 1/24* (2013.01); *H04W 24/00* (2013.01); *H04W 88/02* (2013.01); *H04W 88/085* (2013.01)

(58) Field of Classification Search
  CPC ..... H04W 24/00; H04W 24/04; H04W 88/02; H04W 88/085; H04M 1/24

USPC ................... 455/425, 423, 424, 422.1
See application file for complete search history.

(56) References Cited

U.S. PATENT DOCUMENTS

2010/0278530 A1* 11/2010 Kummetz et al. ............... 398/41
2013/0017823 A1*  1/2013 Mao et al. ..................... 455/424

FOREIGN PATENT DOCUMENTS

| EP | 1542483 A1 * | 6/2005 | |
| JP | EP 1542483 A1 * | 6/2005 | ............ H04W 36/06 |
| JP | 2012-147193 | 8/2012 | |

* cited by examiner

*Primary Examiner* — Khai M Nguyen
(74) *Attorney, Agent, or Firm* — Fujitsu Patent Center

(57) ABSTRACT

A REC device of a base station includes a switch instructing unit and an extension signal processor. The switch instructing unit monitors the state of the REC device, and based on a result of the monitoring, determines switching from the REC device to an extension REC device. When the switching is determined, the extension signal processor acquires a signal transmitted from the extension REC device, and requests the switching from the extension REC device. The extension REC device includes an extension signal processor and a digital processor. The extension signal processor receives the switch request from the extension signal processor of the REC device. In response to the received switch request, the digital processor sets the parameters of the REC device in the extension REC device, and establishes a link to a RE.

7 Claims, 10 Drawing Sheets

COMMUNICATION CONTROL SYSTEM, COMMUNICATION CONTROL DEVICE, AND COMMUNICATION CONTROL METHOD

CROSS-REFERENCE TO RELATED APPLICATION

This application is based upon and claims the benefit of priority of the prior Japanese Patent Application No. 2013-109395, filed on May 23, 2013, the entire contents of which are incorporated herein by reference.

FIELD

The embodiments discussed herein are related to a communication control system, communication control devices, and a communication control method.

BACKGROUND

In recent years, long time evolution (LTE) has been spreading as a wireless communication technique compliant with generation partnership project (3GPP). In LTE, a base station such as an evolved node B (eNB) is interposed between a mobile station (UE: User Equipment) and a core network (CN), to provide various kinds of mobile communication services. At the base station, radio equipment (RE) that includes a radio frequency (RF) circuit and an amplifier, and a radio equipment control (REC) device that includes a digital processor are cable-connected by a common public radio interface (CPRI). The REC device further includes a radio interface, a baseband unit, a highway (HWY) interface, and the like in the digital processor, for example.

Patent Document 1: Japanese Laid-open Patent Publication No. 2012-147193

In case the digital processor becomes inoperative due to a hardware malfunction or the like, the REC device duplicates the radio interface, the baseband unit, the HWY interface, and the like in the digital processor, to realize a redundant configuration. When a malfunction occurs, the base station can switch from the component (the baseband unit, for example) having the malfunction to the other normal component, to continue to provide the communication service. However, each related REC device incorporates redundant components therein, resulting in an increase in device size. Also, power consumption and costs increase accordingly. Such problems may be caused not only by a hardware malfunction in a REC device but also by other factors such as power supply suspension due to an electrical power failure or resource shortage due to a band limitation or the like.

SUMMARY

According to an aspect of the embodiments, a communication control system includes: a first communication control device that performs a communication with radio equipment; and a second communication control device. The first communication control device includes: a determining unit that monitors a state of the first communication control device and determines switching from the first communication control device to the second communication control device based on a result of the monitoring; and a requesting unit that acquires a signal transmitted from the second communication control device and requests the switching to the second communication control device when the determining unit determines the switching. The second communication control device includes: a receiving unit that receives the switch request by the requesting unit of the first communication control device; and a controller that sets a parameter of the first communication control device to the second communication control device and establishes a link to the radio equipment in response to the switch request received by the receiving unit.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings.

Figure 1:
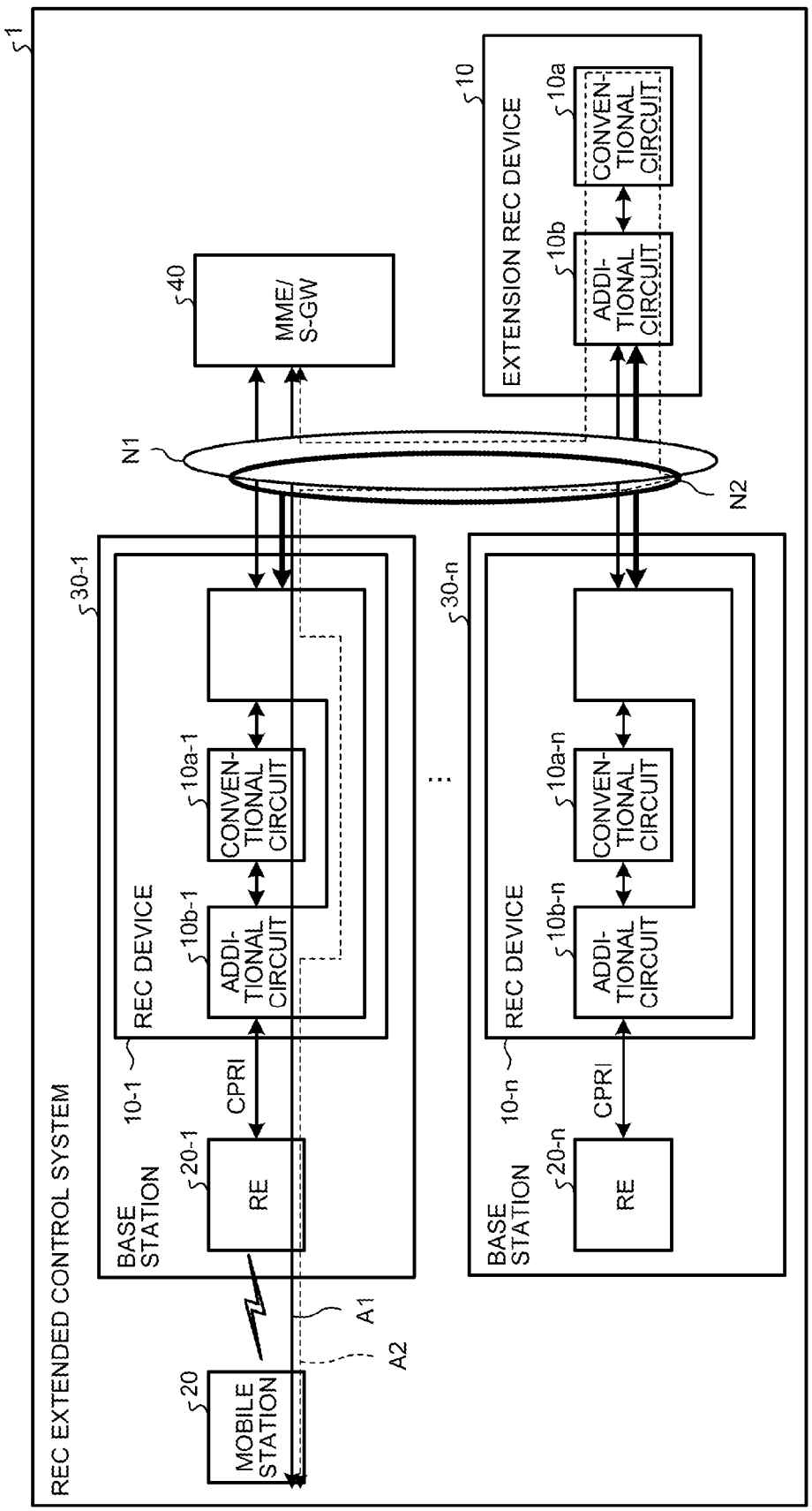
FIG. 1 is a diagram for explaining an outline of a REC extended control system.

First, a REC extended control system according to an embodiment disclosed by this application is described. FIG. 1 is a diagram for explaining an outline of an REC extended control system 1. As illustrated in FIG. 1, in the REC extended control system 1, a base station 30-1 including a REC device 10-1 and a RE 20-1, and base stations 30-2 through 30-n (n being an integer of 2 or greater) are connected to networks N1 and N2. In the REC extended control system 1, an extension REC device 10 is also connected to the networks N1 and N2. The network N1 is a core network, and the network N2 is an extension optical link network. Further, a mobile station 20 is connected to the RE 20-1 of the base station 30-1 via a wireless link. A mobility management entity/serving-gateway (MME/S-GW) 40 is also connected to the networks N1 and N2.

The extension REC device 10 and REC devices 10-1, ..., 10-n include a related circuit 10a and an additional circuit 10b, and related circuits 10a-1, ..., 10a-n and additional circuits 10b-1, ..., 10b-n, respectively. The related circuit 10a and the related circuits 10a-1, ..., 10a-n are digital processors each including a radio interface (IF), a baseband unit, a highway interface (HWYIF), and the like. The additional circuit 10b and the additional circuits 10b-1, ..., 10b-n will be described later. In FIG. 1, arrow A1 indicates a related signal path or the signal path prior to switching (at the time of disconnection from the extension REC device 10), and arrow A2 indicates the signal path after switching (at the time of connection to the extension REC device 10).

Figure 2:
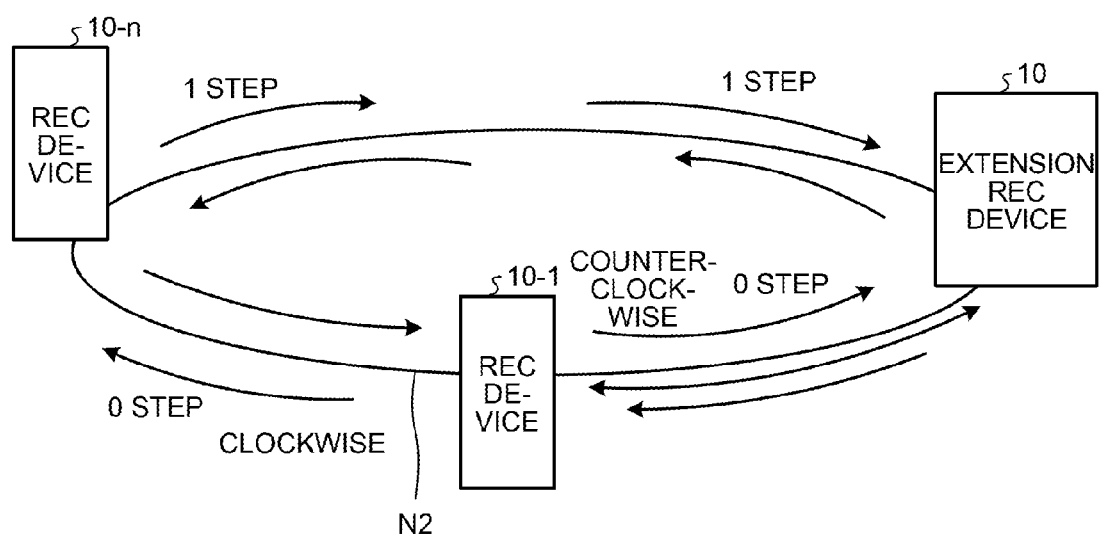
FIG. 2 is a conceptual diagram illustrating a connection configuration of an extension optical link network.

FIG. 2 is a conceptual diagram illustrating a connection configuration in the extension optical link network N2. In FIG. 2, each step number indicates the number of REC devices existing between the REC device 10-1 and the extension REC device 10 when the REC device 10-1 performs communication with the extension REC device 10. In the extension optical link network N2, signals in conformity with the CPRI protocol are constantly transmitted and received. As illustrated in FIG. 2, no REC devices exist between the REC device 10-1 and the extension REC device 10 when a signal travels clockwise from the REC device 10-1 to the extension REC device 10. Accordingly, the number of steps is "0 step" in this case. In the case of counterclockwise rotation, the number of steps is "0 step" when a signal travels to the REC device 10-n. After the relay by the REC device 10-n, however, the number of steps is "1 step". Accordingly, the number of steps increases to two or more where n is 3 or greater.

Figure 3:
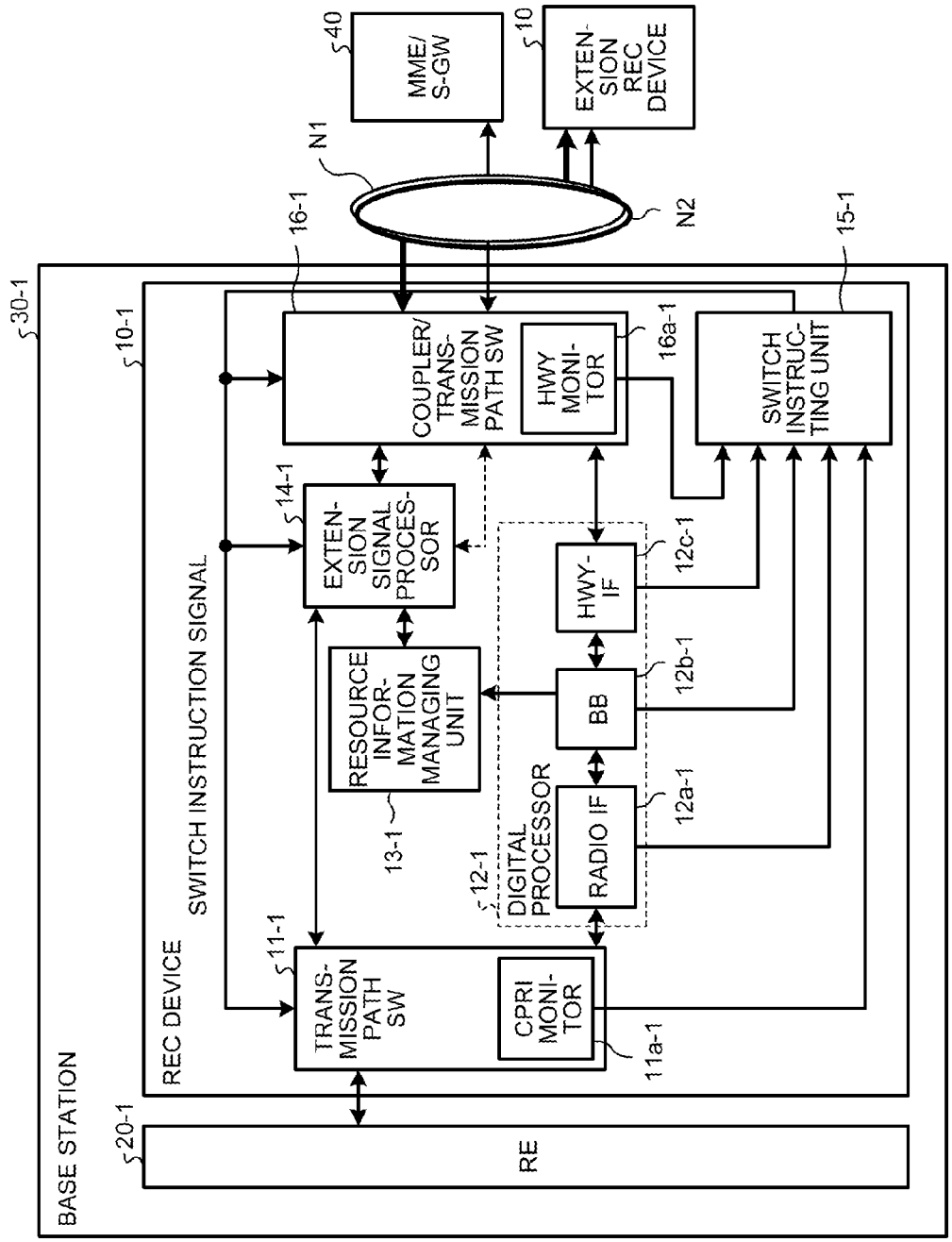
FIG. 3 is a diagram illustrating the structure of a REC device.

FIG. 3 is a diagram illustrating the structure of the REC device 10-1. As illustrated in FIG. 3, the REC device 10-1 includes a transmission path switch (SW) 11-1, a digital processor 12-1, a resource information managing unit 13-1, an extension signal processor 14-1, a switch instructing unit 15-1, and a coupler/transmission path SW 16-1. The respective components are connected unidirectionally or bi-directionally to one another so that signals and data can be input and output.

The transmission path switch (SW) 11-1 is a CPRI between the RE 20-1 and the digital processor 12-1. The transmission path SW 11-1 includes a CPRI monitor 11a-1 that monitors CPRI signals from the RE 20-1. The digital processor 12-1 includes a radio interface (IF) 12a-1, a baseband unit 12b-1, and a HWYIF 12c-1. The radio IF 12a-1 transmits and receives I/Q signals and maintenance signals to and from the RE 20-1 and the baseband unit 12b-1. The baseband unit 12b-1 performs processing, such as error correction coding, radio framing, data modulation, frequency-time conversion, and multiple-input and multiple-output (MIMO) transmission, on the signals to be output to the radio IF 12a-1. The baseband unit 12b-1 performs processing, such as time-frequency conversion, data demodulation, signal separation, error correction decoding, retransmission, adaptive modulation, and scheduling, on the signals that are input from the radio IF 12a-1. The HWYIF 12c-1 terminates signals of the Ethernet (a registered trade name) and the internet protocols (IP).

The resource information managing unit 13-1 shares radio resource information with the extension REC device 10. The extension signal processor 14-1 performs communication with the extension REC device 10 when a hardware malfunction or an electrical power failure occurs in the REC device 10-1. The switch instructing unit 15-1 transmits a switch signal to the transmission path SW 11-1, the extension signal processor 14-1, and the coupler/transmission path SW 16-1 when a malfunction or an electrical power failure occurs. The coupler/transmission path SW 16-1 is an interface between the REC device 10-1 and the extension REC device 10. The coupler/transmission path SW 16-1 includes a HWY monitor 16a-1 that monitors IP signals that are received from the core network N1.

Normally, the REC device 10-1 controls communication between the RE 20-1 and the core network N1 by using the transmission path SW 11-1, the digital processor 12-1, and the coupler/transmission path SW 16-1. When a battery is used due to occurrence of a malfunction or an electrical power failure, or when the radio band needs to be extended, the REC device 10-1 bypasses the digital processor 12-1 by using the transmission path SW 11-1, the extension signal processor 14-1, and the coupler/transmission path SW 16-1. In this manner, the REC device 10-1 controls communication between the RE 20-1 and the extension optical link network N2.

Although the structure of the REC device 10-1 has been described as a typical example, the structures of the other REC devices 10-2, ..., 10-n are the same as the structure of the REC device 10-1. Therefore, the same components as those of the REC device 10-1 are denoted by the reference numerals with the same last numbers as those used for the components of the REC device 10-1, and those components are not illustrated in the drawings and will not be described below in detail.

Figure 4:
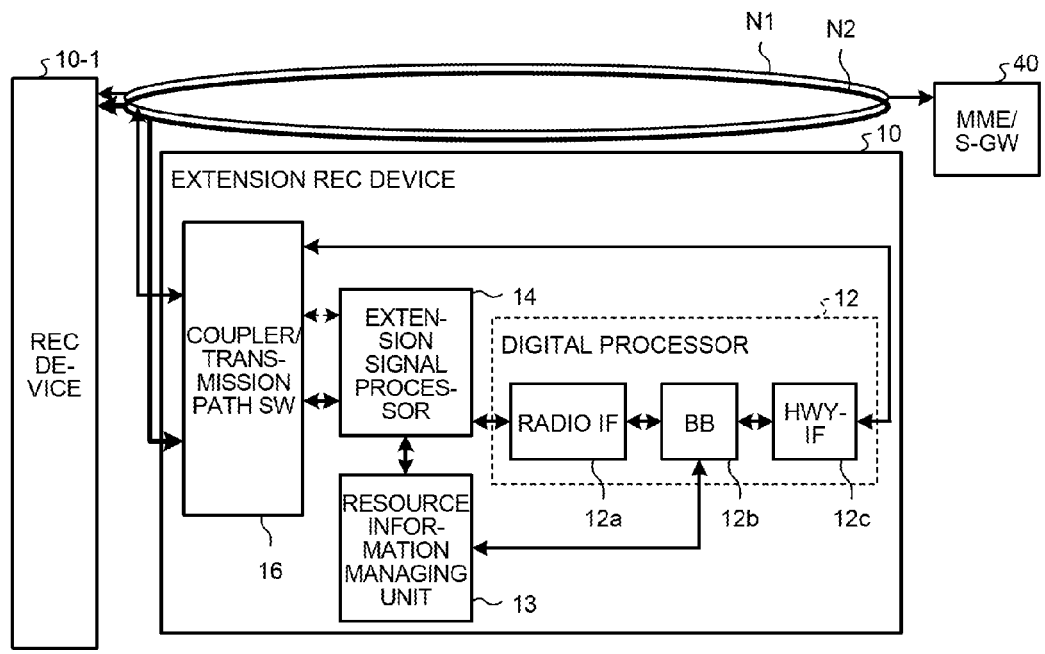
FIG. 4 is a diagram illustrating the structure of an extension REC device.

Next, the structure of the extension REC device 10 is described. FIG. 4 is a diagram illustrating the structure of the extension REC device 10. As illustrated in FIG. 4, the extension REC device 10 performs indirect communication with the RE 20-1 via the REC device 10-1, for example. The extension REC device 10 has the same structure as that of the REC device 10-1 illustrated in FIG. 3, except for not including the transmission path SW 11-1 and the switch instructing unit 15-1. Therefore, the common components are denoted by the same reference numerals as those used for the components of the REC device 10-1 except for the hyphens and the numbers following the hyphens. Detailed explanation of those common components is not repeated herein. Specifically, a digital processor 12, a resource information managing unit 13, an extension signal processor 14, and a coupler/transmission path SW 16 are equivalent to the digital processor 12-1, the resource information managing unit 13-1, the extension signal processor 14-1, the coupler/transmission path SW 16-1 of the REC device 10-1, respectively.

Figure 5:
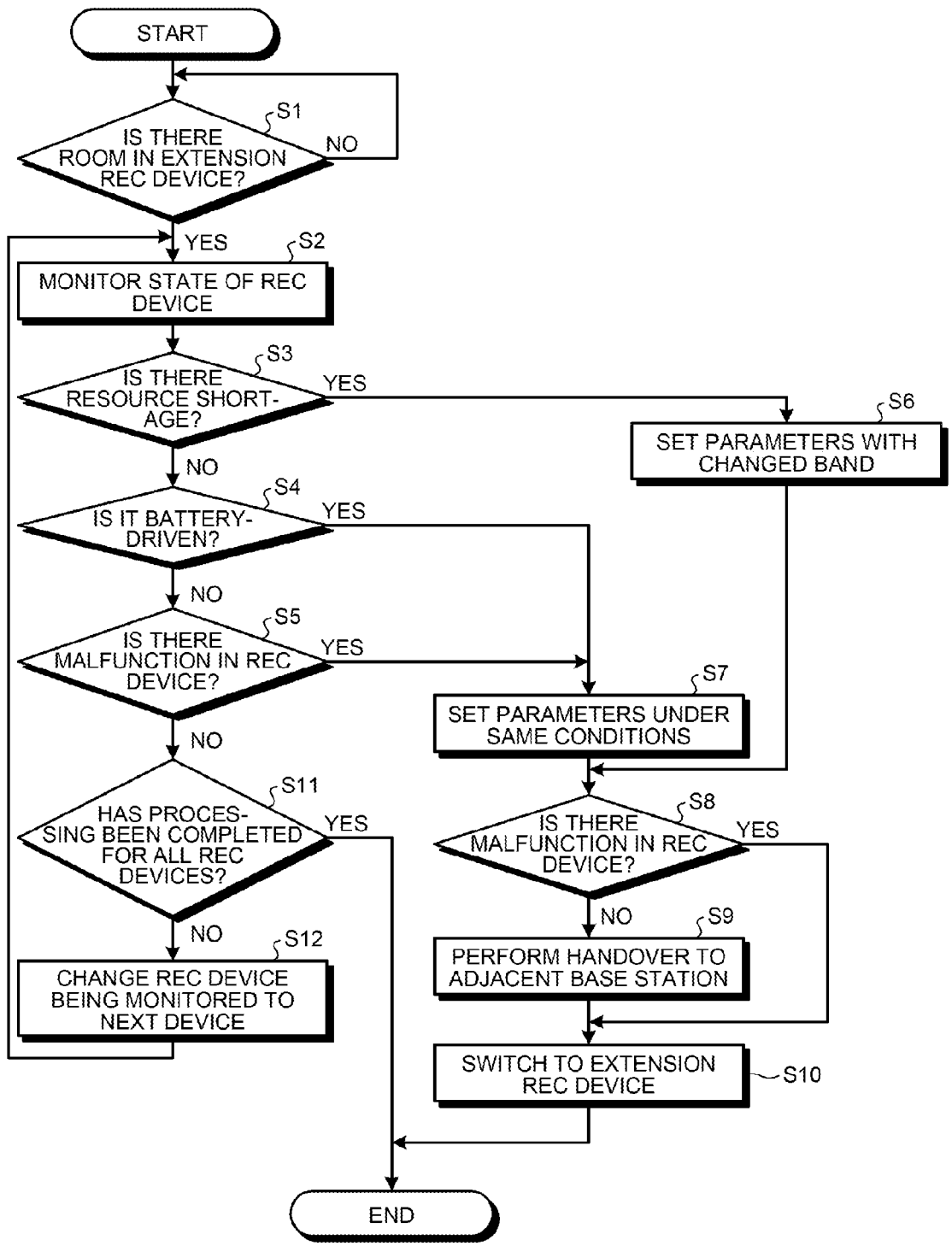
FIG. 5 is a flowchart for explaining an operation of the REC extended control system at the time of switching to the extension REC device.

Next, operations are described. FIG. 5 is a flowchart for explaining an operation of the REC extended control system 1 at the time of switching to the extension REC device 10. The description of the operation is based on the assumption that the switching is performed from the REC device 10-1 in this embodiment. However, the same operation can also be performed when switching is performed from any of the other REC devices 10-2, ..., 10-n.

First, in S1, the extension signal processor 14-1 of the REC device 10-1 determines whether there is room in the extension REC device 10. This determination is performed based on whether a token signal is received. Specifically, the REC device 10-1 monitors token signals that are periodically delivered from the extension REC device 10, and, when a token signal is received, the REC device 10-1 determines that there is room in the extension REC device 10. In a case where a token is not received for a predetermined period of time, on the other hand, the REC device 10-1 determines that there is no room in the extension REC device 10. An operator, instead of the REC device 10-1, may determine whether there is room.

If the result of the determination in S1 represents that there is no room in the extension REC device 10 (S1: No), the extension signal processor 14-1 stands by until there is room.

If there is room (S1: Yes), the switch instructing unit 15-1 monitors the state of the REC device 10-1 in operation (S2). By monitoring the state of the REC device 10-1, the switch instructing unit 15-1 determines in which one of the following states the REC device 10-1 is, "resource shortage", "battery-driven", and "REC device malfunction" (S3 through S5).

If the result of the above determination does not match any of the states (S5: No), the operation moves on to the later described process of S11 and the later steps. If the result of the above determination matches one of the states, the extension REC device 10 performs the same parameter setting as that of the REC device 10-1 as the start point of the switching.

Specifically, in a case where "resource shortage" is sensed as a result of the monitoring (S3: Yes), the extension signal processor 14 of the extension REC device 10 sets parameters in the digital processor 12, the resource information managing unit 13, and the coupler/transmission path SW 16. The parameters have a band changed from that of the parameters of the REC device 10-1 as the start point of the switching (S6). As a result, band-extended parameters are set in the extension REC device 10. In a case where "battery-driven" or "REC device malfunction" is sensed as a result of the monitoring (S4: Yes, or S5: Yes), the extension signal processor 14 sets parameters in the digital processor 12, the resource information managing unit 13, and the coupler/transmission path SW 16, under the same conditions as those for the REC device 10-1 as the start point of the switching (S7).

After the process in S6 or S7, the extension signal processor 14-1 of the REC device 10-1 as the start point of the switching determines whether a malfunction has occurred in its own REC device 10-1 (S8). If the result of the determination represents that a malfunction has not occurred (S8: No), the digital processor 12-1 of the REC device 10-1 hands over a mobile station such as the mobile station 20 to the REC device 10-2 of the adjacent base station 30-2 (S9). After that, the extension signal processor 14-1 of the REC device 10-1 performs the process of switching to the REC device 10 (S10). If the result of the determination represents that a malfunction has occurred (S8: Yes), the REC device 10-1 is unable to perform the handover. Therefore, the REC device 10-1 skips the process in S9, and performs the process in S10.

In S11, the switch instructing unit 15-1 of the REC device 10-1 determines whether the above series of processes in S2 through S10 has been performed for all the REC devices 10-1, 10-2, ..., 10-n included in the REC extended control system 1. If the result of the determination represents that the processing has not been completed for all the REC devices 10-1, 10-2, ..., 10-n in the system (S11: No), the REC device being monitored is changed to the next REC device (S12). The processes in S2 and thereafter are again performed for the REC device. If the result of the determination in S11 represents that the processing has been completed for all the REC devices 10-1, 10-2, ..., 10-n in the system (S11: Yes), the processing is ended.

Figure 6:
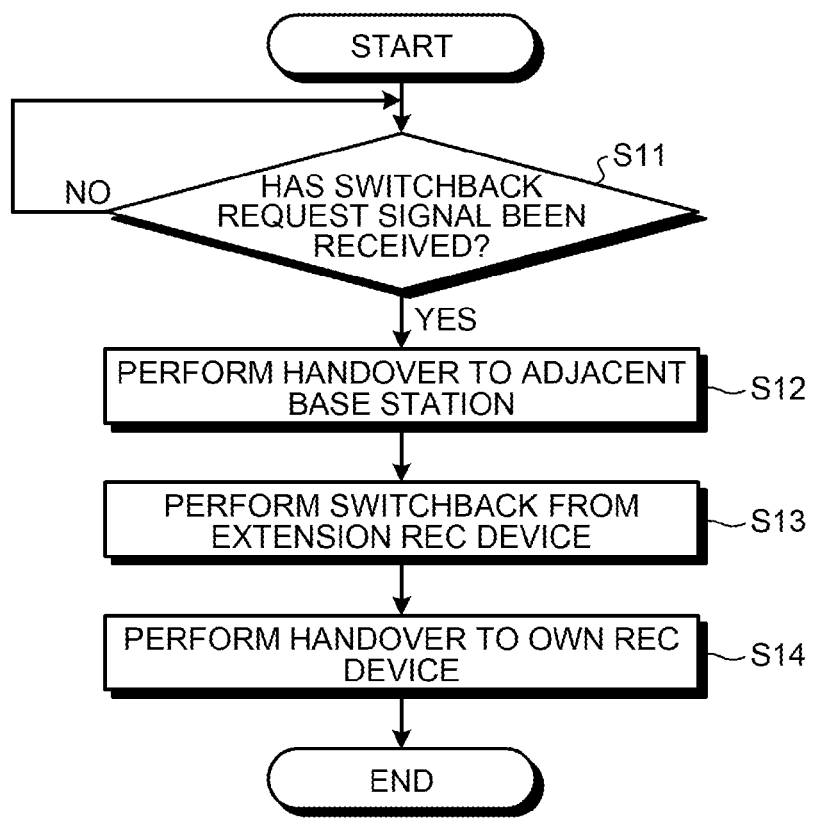
FIG. 6 is a flowchart for explaining an operation of the REC extended control system at the time of switchback from the extension REC device.

As the processing at the time of switching has been described so far, the processing at the time of switching back is now described. FIG. 6 is a flowchart for explaining the operation of the REC extended control system 1 at the time of switching back from the extension REC device 10. The description of the operation is based on the assumption that the switching is performed from the REC device 10-1 in this embodiment. However, the same operation can also be performed when switching is performed from any of the other REC devices 10-2, ..., 10-n.

First, in S11, the extension signal processor 14 of the extension REC device 10 awaits reception of a switchback request signal transmitted from the REC device 10-1. When sensing the reception (S11: Yes), the extension REC device 10 hands over mobile stations including the mobile station 20 from the extension REC device 10 to the adjacent base station 30-2 by using the digital processor 12 (S12).

When the handover is completed, the extension signal processor 14 of the extension REC device 10 performs switchback from its own REC device to the REC device 10-1 as the start point of the switching (S13). After the switchback, the REC device 10-2 hands over the mobile stations including the mobile station 20 from the adjacent base station 30-2 to the REC device 10-1 by using the digital processor 12-2 (S14).

Referring now to the sequence diagrams in FIGS. 7 through 10, operations of the REC extended control system 1 are described in greater detail. The description of operations is based on the assumption that a malfunction or the like has occurred in the REC device 10-1 among the REC devices 10-1, 10-2, ..., 10-n in this embodiment. However, the same processing can also be performed when a malfunction occurs in any of the other REC devices 10-2, ..., 10-n.

Figure 7:
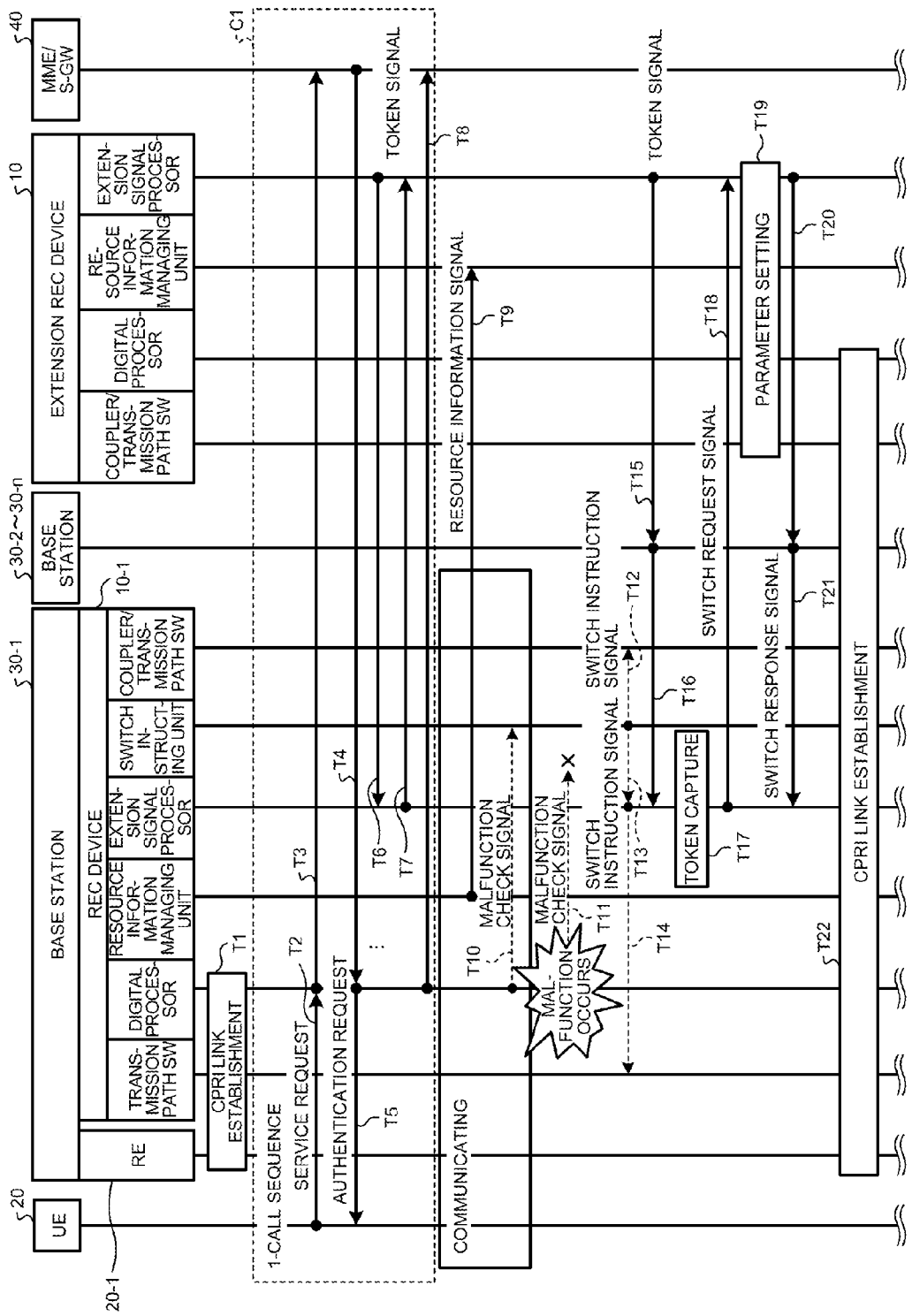
FIG. 7 is the first half of a sequence diagram for explaining an operation to switch to the extension REC device at the time of occurrence of a malfunction and a switchback operation.

FIG. 7 is the first half of a sequence diagram for explaining an operation to switch to the extension REC device 10 at the time of occurrence of a malfunction and a switchback operation. First, in T1, a CPRI link is established between the RE 20-1 and the REC device 10-1 in the base station 30-1.

After the establishment of the link, a 1-call sequence C1 is started between the mobile station 20 and the MME/S-GW 40. Specifically, the mobile station 20 is connected to the base station 30-1 by one call, and transmits a service request to the MME/S-GW 40 via the base station 30-1 (T2, T3). Upon receipt of the service request, the MME/S-GW 40 returns an authentication request to the mobile station 20 via the base station 30-1 (T4, T5).

The start of the 1-call sequence C1 may be triggered by the transmission of a service request from the mobile station 20 as described above. However, the start of the 1-call sequence C1 may be triggered by transmission of a paging signal from the MME/S-GW 40.

In T6 and T7, in the extension optical link network N2 that connects the extension REC device 10 to the REC devices 10-1, ..., 10-n, a signal for giving a transmission right to the extension REC device 10 (hereinafter referred to as the "token signal") is circulated. The token signal is transmitted from the extension signal processor 14, with the extension REC device 10 being the master (transmitter).

The REC device 10-1 receives the authentication request, performs message transmission and reception in accordance with the series of protocol sequences, and notifies the MME/S-GW 40 of a complete message by using the digital processor 12-1 (T8). After the notification, the REC device 10-1 periodically transmits a resource information signal to the extension REC device 10, to report the resource state of its own device (T9).

The REC device 10-1 constantly monitors malfunctions of the digital processor 12-1 by using the switch instructing unit 15-1. The switch instructing unit 15-1 receives inputs of malfunction check signals such a level signal and a pattern signal that are periodically transmitted from the digital processor 12-1, and determines whether there is a malfunction (T10). If the switch instructing unit 15-1 does not receive any input of a malfunction check signal for a predetermined period of time (T11), the switch instructing unit 15-1 outputs a switch instruction signal to the coupler/transmission path SW 16-1, the extension signal processor 14-1, and the transmission path SW 11-1 (T12 through T14).

In this embodiment, the REC device 10-1 among the REC devices 10-1, ..., 10-n captures the token signal. Specifically, after circulating among the REC devices 10-1, ..., 10-n (T15, T16), the token signal is captured by the extension signal processor 14-1 that has received an input of the switch instruction signal upon occurrence of a malfunction (T17).

After acquiring a transmission right with respect to the extension REC device 10 by capturing the token signal, the extension signal processor 14-1 of the REC device 10-1 transmits a switch request signal to the extension REC device 10 (T18). Upon receipt of the switch request signal, the extension REC device 10 sets the parameters of the REC device 10-1 in its own device by using the extension signal processor 14. By doing so, the extension REC device 10 identifies with the REC device 10-1 (T19). In the identifying process, the extension REC device 10 uses parameters for operating the respective REC devices 10-1, . . . , 10-n to be switched to. The parameters are stored beforehand in a memory in its own device.

After completing the identifying with the REC device 10-1, the extension REC device 10 returns a switch response signal to the base stations 30-2, . . . , 30-n and the base station 30-1 by using the extension signal processor 14 (T20, T21). As a result, the base station 30-1 senses that the switching from the REC device 10-1 to the extension REC device 10 has been completed, and the other base stations 30-2, . . . , 30-n sense that the extension REC device 10 has been made to identify with the REC device 10-1.

Thereafter, the CPRI link that has been established between the RE 20-1 and the REC device 10-1 is established between the RE 20-1 and the extension REC device 10 (T22). The base station 30-1 then causes a CPRI signal received by the RE 20-1 to travel through a bypass to the extension REC device 10.

Figure 8:
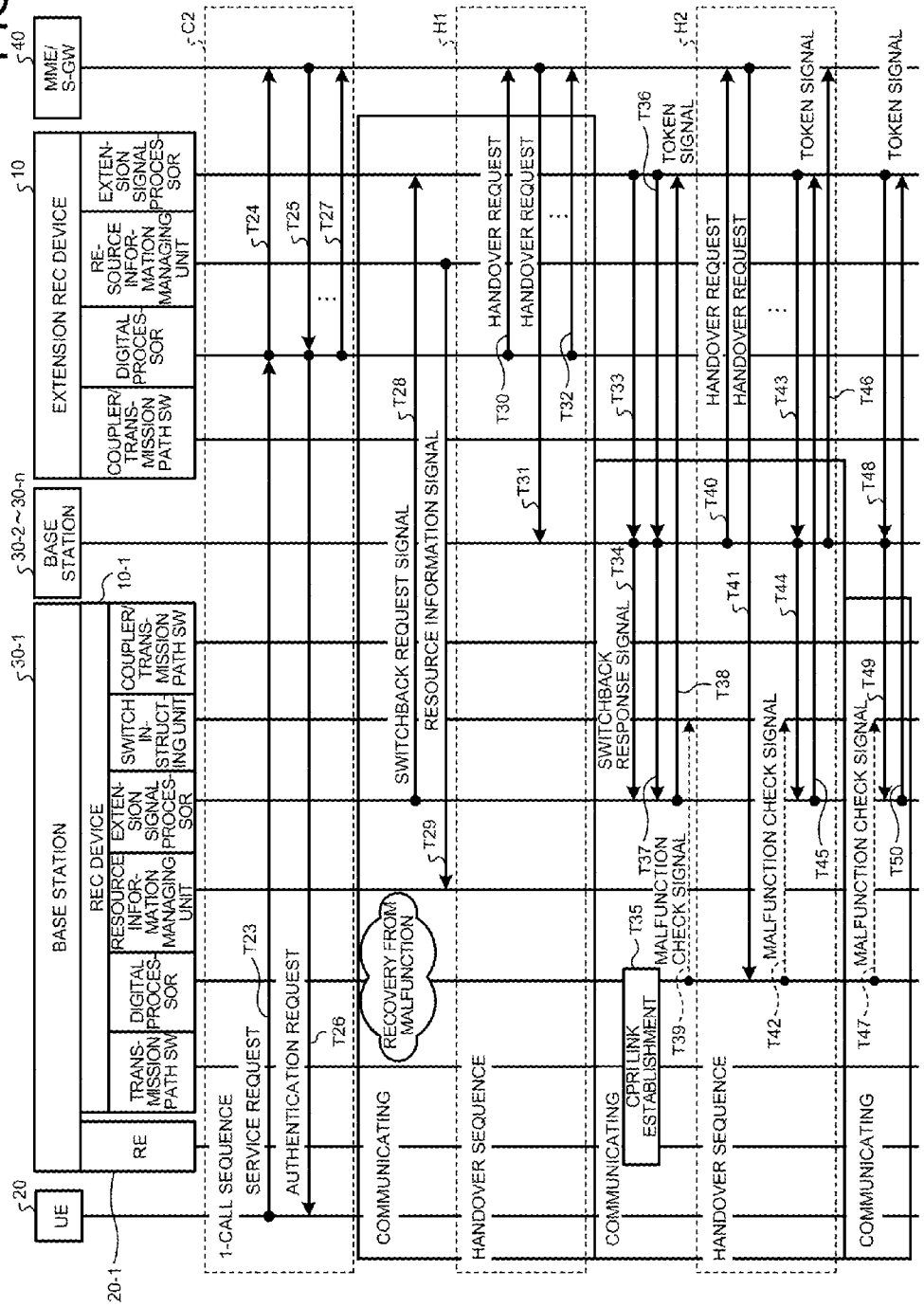
FIG. 8 is the second half of the sequence diagram for explaining an operation to switch to the extension REC device at the time of occurrence of a malfunction and a switchback operation.

FIG. 8 is the second half of the sequence diagram for explaining an operation to switch to the extension REC device 10 at the time of occurrence of a malfunction and a switchback operation. A 1-call connection using the above described CPRI link is performed between the mobile station 20 and the extension REC device 10, and the mobile station 20 and the extension REC device 10 then enter a communication state (1-call sequence C2). The respective processes in steps T23 through T27 in the 1-call sequence C2 are the same as the respective processes in steps T2 through T5 and T8 (see FIG. 7) in the above mentioned 1-call sequence C1. Therefore, detailed explanation of them is not repeated herein. Specifically, the respective processes in steps T23 through T26 and T27 in FIG. 8 are equivalent to the respective processes in steps T2 through T5 and T8 in FIG. 7.

After T27, whether new call processing is performed by a 1-call sequence is determined by whether a call release by timeout or the like has occurred. For example, in a case where a call release has occurred between the mobile station 20 and the base station 30-1, new call processing by a 1-call sequence occurs.

After the switching, the operation is continued by the extension REC device 10. However, when the REC device 10-1 recovers from the malfunction, the extension signal processor 14-1 transmits a switchback request signal to the extension REC device 10 (T28). In T29, the extension REC device 10 reports the resource state of its own device to the REC device 10-1 by periodically transmitting a resource information signal to the REC device 10-1 as in the above described T9.

A handover sequence H1 for switchback is then performed. When sensing reception of the switchback request signal, the extension signal processor 14 of the extension REC device 10 temporarily hands over mobile stations including the mobile station 20 to an adjacent base station (such as the base station 30-2 in this embodiment) within radio wave reach. Specifically, the extension REC device 10 transmits a handover request from the digital processor 12 to the adjacent base station 30-2 via the MME/S-GW 40 (T30, T31, T32). The same processes as those in T30, T31, and T32 may be performed for the other adjacent base stations 30-3 through 30-n.

When the handover from the extension REC device 10 to the adjacent base stations 30-2 through 30-n is completed, the extension REC device 10 returns a switchback response signal to the base stations 30-2, . . . , 30-n and the base station 30-1 by using the extension signal processor 14 (T33, T34). As a result, the base station 30-1 senses that the switchback from the extension REC device 10 to the REC device 10-1 has been completed, and the other base stations 30-2, . . . , 30-n sense that the extension REC device 10 has been liberated from the REC device 10-1.

In T35, a CPRI link is again established between the RE 20-1 and the REC device 10-1 in the base station 30-1. At the same time, the extension signal processor 14 of the extension REC device 10 resumes transmission and circulation of a token signal (T36 through T38). Also, the digital processor 12-1 of the REC device 10-1 resumes periodical transmission of malfunction check signals such as a level signal and a pattern signal to the switch instructing unit 15-1 (T39).

After that, a handover sequence H2 from the adjacent base stations 30-2 through 30-n to the base station 30-1 is performed. The handover sequence H2 includes the same processes as those of the above described handover sequence H1, and therefore, detailed explanation of them is not repeated herein. Specifically, the respective processes in steps T40 and T41 through T46 in FIG. 8 are equivalent to the respective processes in the above described steps T30, T31, and T32.

The handover sequence H2 is performed depending on the radio wave environments of the base stations 30-1 through 30-n. For example, the handover sequence H2 is performed when the radio wave environment between the mobile station 20 and the base station 30-1 is better than the radio wave environments between the mobile station 20 and the adjacent base stations 30-2 through 30-n. After the handover is completed, the base station 30-1 enters a state of communication with mobile stations including the mobile station 20.

The digital processor 12-1 of the REC device 10-1 continues to transmit the malfunction check signals to the switch instructing unit 15-1 (T42, T47). The extension REC device 10 continues to circulate the token signal among the base stations 30-1 through 30-n (T43 through T45, T48 through T50).

The switching process at the time of occurrence of a malfunction and the switchback process have been described so far. Next, a switching process and a switchback process in other cases are described.

Figure 9:
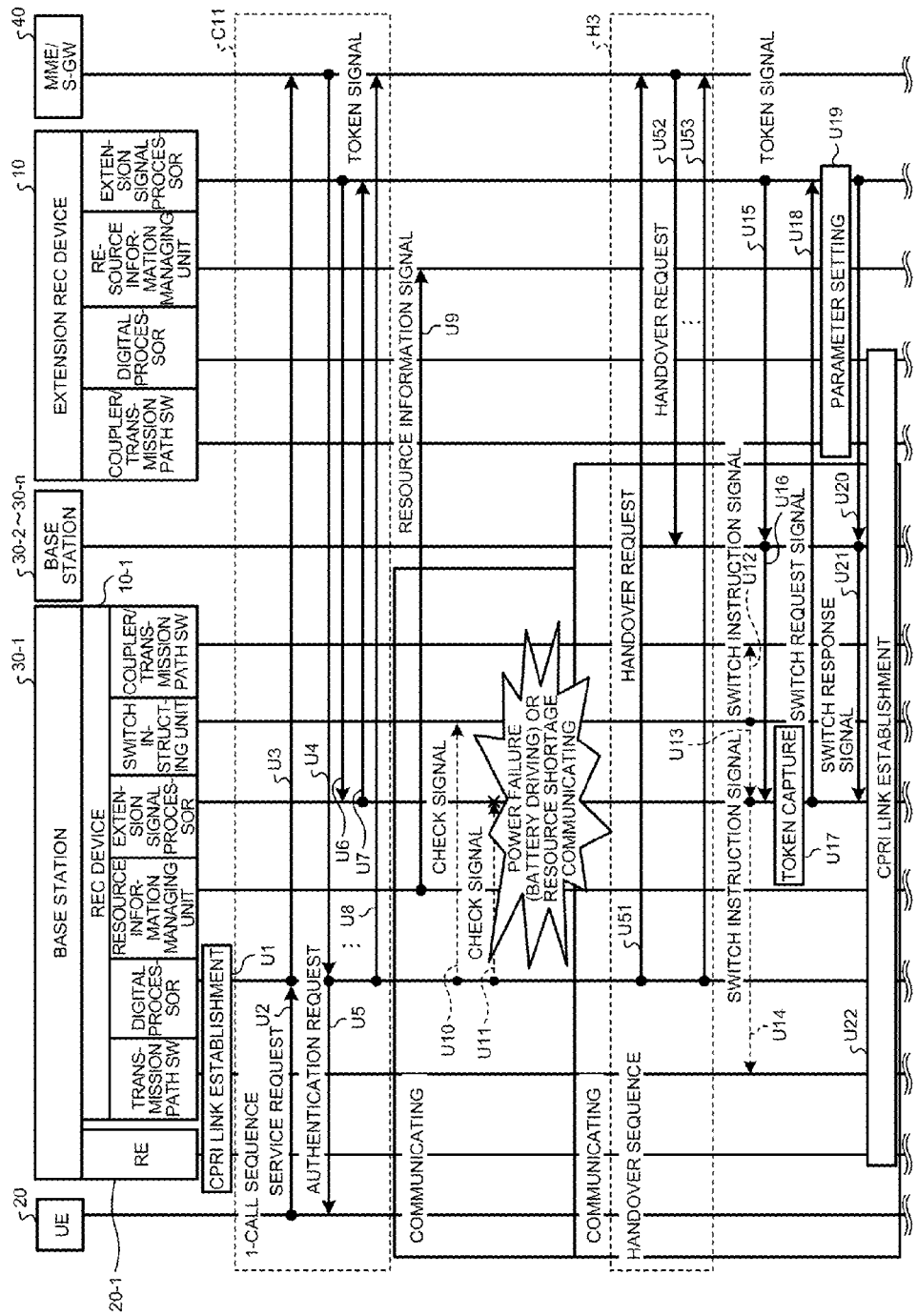
FIG. 9 is the first half of a sequence diagram for explaining an operation to switch to the extension REC device at the time of battery driving and resource shortage, and a switchback operation.

FIG. 9 is the first half of a sequence diagram for explaining an operation to switch to the extension REC device at the time of battery driving or resource shortage and a switchback operation. FIG. 9 includes the same processes as those included in FIG. 7 for explaining the operation at the time of occurrence of a malfunction. Therefore, the common steps are denoted by reference numerals with the same last numbers as those of the reference numerals in FIG. 7, and detailed explanation of them is not repeated herein. Specifically, the respective processes in steps U1 through U11 in FIG. 9 are equivalent to the respective processes in steps T1 through T11 in FIG. 7.

A handover sequence H3 for switching is then performed. When sensing that its own device is battery-driven or is short of resources, the REC device 10-1 temporarily hands over mobile stations including the mobile station 20 to an adjacent base station (such as the base station 30-2 in this embodiment)

within radio wave reach. Specifically, the REC device 10-1 transmits a handover request from the digital processor 12-1 to the adjacent base station 30-2 via the MME/S-GW 40 (U51, U52, U53). The same processes as those in U51, U52, and U53 may be performed for the other adjacent base stations 30-3 through 30-n.

When the handover from the base station 30-1 to the adjacent base stations 30-2 through 30-n is completed, the same parameters as those of the REC device 10-1 are set in the extension REC device 10, and the extension REC device 10 identifies with the REC device 10-1. As a result, the CPRI link established between the RE 20-1 and the REC device 10-1 is established hereafter between the RE 20-1 and the extension REC device 10. The specific processes in U12 through U22 in FIG. 9 are the same as the respective processes in steps T12 through T22 in FIG. 7. Therefore, the common steps are denoted by reference numerals with the same last numbers as those of the reference numerals in FIG. 7, and detailed explanation of them is not repeated herein.

The switch request signal in U18 includes information indicating that the reason for the switching is battery driving or resource shortage. Upon receipt of the switch request signal, the extension REC device 10 determines the reason for the switching. In a case where the reason is "resource shortage", the extension REC device 10 performs a band extension when setting the parameters of the base station 30-1 in its own device. At the time of the band extension, the extension REC device 10 can also be controlled by a maintainer.

Through the above described processes, the REC device 10-1 can cause the CPRI signal received from the RE 20-1 to travel through a bypass to the extension REC device 10. After the switching, the communication between the RE 20-1 of the base station 30-1 and the extension REC device 10 is performed through a CPRI link, and the communication between the mobile station 20 and the base station 30-1 enters an active state in which a 1-call or handover connection is possible.

Figure 10:
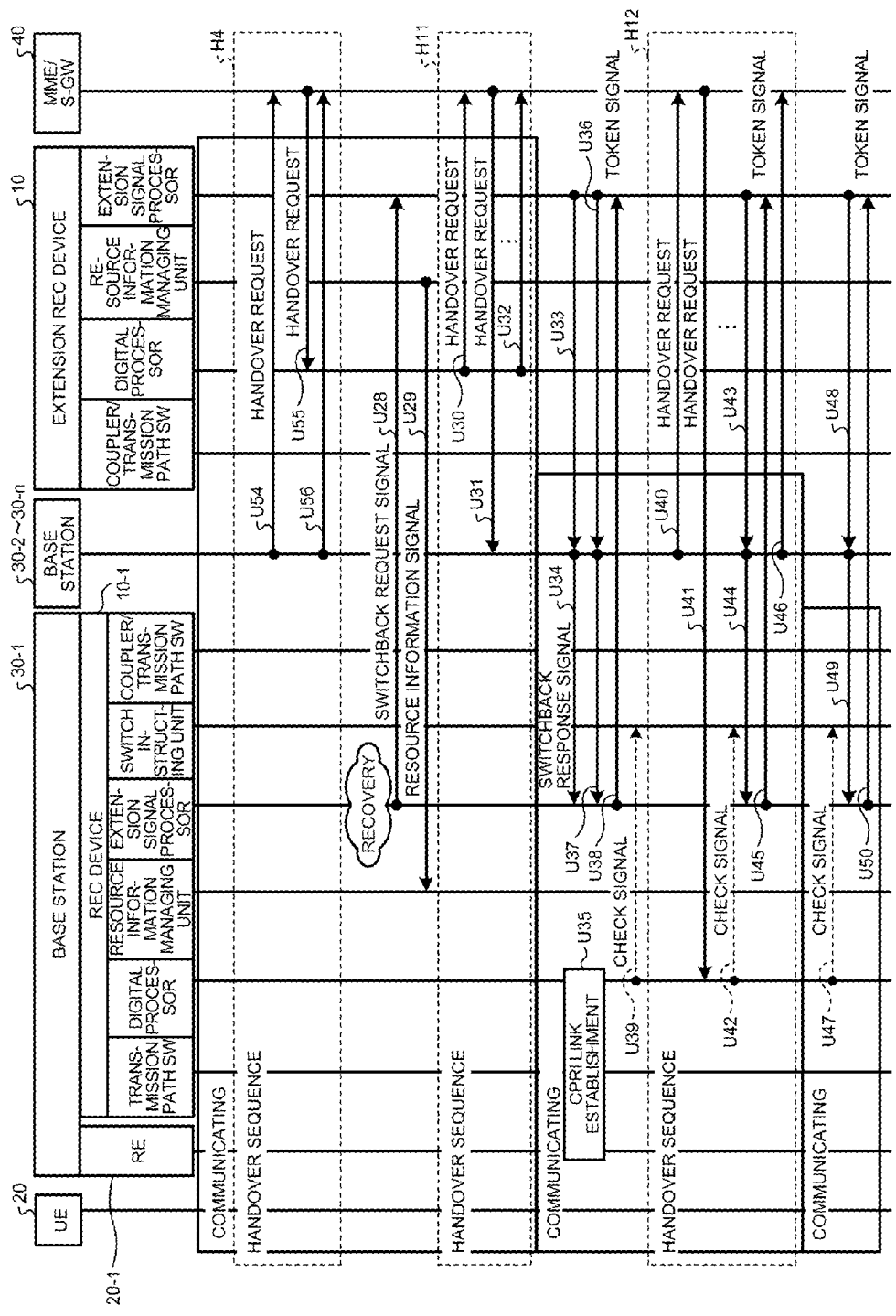
FIG. 10 is the second half of the sequence diagram for explaining an operation to switch to the extension REC device at the time of battery driving and resource shortage, and a switchback operation.

FIG. 10 is the second half of the sequence diagram for explaining an operation to switch to the extension REC device at the time of battery driving or resource shortage and a switchback operation. After the process in U22 is completed, a handover sequence H4 for switching is again performed. Specifically, when sensing handover from its own device to a mobile station, the base station 30-2 hands over the mobile stations including the mobile station 20 to the extension REC device 10. Specifically, the base station 30-2 transmits a handover request from the digital processor 12-2 to the extension REC device 10 via the MME/S-GW 40 (U54, U55, U56). The same processes as those in U54, U55, and U56 may be performed for the other adjacent base stations 30-3 through 30-n.

As described above, switching between REC devices is realized by stepwise handover. Specifically, the REC extended control system 1 interposes the other base stations 30-2 through 30-n in the execution of handover for switching, so as to avoid direct handover from the base station 30-1 to the extension REC device 10. As a result, a time lag is caused between the base station 30-1 and the extension REC device 10, and the extension REC device 10 can perform preparations such as parameter setting and the like for identifying with the REC device 10-1. Also, a mobile station can properly change its connection to the switch destination (the extension REC device 10) without disconnection in the communication between the base station 30-1 and the extension REC device 10 that are identified with each other.

After the switching, the operation is performed by the extension REC device 10. However, when batteries become unnecessary in the REC device 10-1, or when resource shortage is solved or resources are secured in the REC device 10-1, the device can recover. Accordingly, switchback from the extension REC device 10 to the REC device 10-1 is started. The switchback process is formed with the processes in U28 through U50 in FIG. 10, and is the same as the processes in steps T28 through T50 illustrated in FIG. 8. Therefore, the common steps are denoted by reference numerals with the same last numbers as those of the reference numerals in FIG. 8, and detailed explanation of them is not repeated herein.

As described above, a switchback process between REC devices is also realized by stepwise handover. Specifically, the REC extended control system 1 interposes the other base stations 30-2 through 30-n in the execution of handover for switchback, so as to avoid direct handover from the extension REC device 10 to the base station 30-1. As a result, a time lag is caused between the extension REC device 10 and the base station 30-1, and the base station 30-1 can perform preparations to accommodate a mobile station connected to the extension REC device 10 via the RE 20-1. Also, the mobile station can properly change its connection to the start point of the switching (the REC device 10-1) without disconnection in the communication between the extension REC device 10 and the base station 30-1 that are identified with each other.

In a case where the extension REC device 10 and each of the REC devices 10-1 through 10-n are connected by an optical link for extension as illustrated in FIG. 2, the REC extended control system 1 communicates uplink and downlink signals by using one optical fiber in the same manner as with a CPRI interface. In the connection configuration illustrated in FIG. 2, when the extension REC device 10 performs a communication with the REC device 10-1, for example, the number of interposed device steps differs between the clockwise rotation and the counterclockwise rotation. Specifically, in a communication starting from the extension REC device 10, the number of device steps in the counterclockwise rotation is "0", while the number of device steps in the clockwise rotation is "1". The extension REC device 10 and each of the REC devices 10-1 through 10-n absorb such a difference in the number of steps through phase adjustment, so as to realize an interface with each of the REs 20-1 through 20-n. Specifically, the extension signal processors 14 and 14-1 through 14-n of the extension REC device 10 and the respective REC devices 10-1 through 10-n each perform a phase comparison between an uplink signal and a downlink signal, and performs phase absorption by using a buffer in its own device.

Furthermore, it is predicted that transmission and reception of CPRI signals over the CN will become possible by virtue of conformity of CPRI signals with the IP (CPRI over Ethernet (a registered trade name)) or the like. In this case, the extension signal processors 14-1 through 14-n of the respective REC devices 10-1 through 10-n turn CPRI signals into internet protocol (IP) packets, and the coupler/transmission path SW 16-1 through 16-n transmit the CPRI signals in conformity with the IP to the CN. In the extension REC device 10, CPRI signals in conformity with the IP are also transmitted and received via the coupler/transmission path SW 16 and the extension signal processor 14. In such a configuration, the above described optical link for extension is unnecessary.

Furthermore, the REC extended control system 1 may select the above described optical link for extension or the CN, depending on circumstances. For example, in a case where the process delay between each of the REC devices 10-1 through 10-n and the respective REs 20-1 through 20-n is equal to or less than a predetermined time (2 to 5 ms, for example), or where the jitter is equal to or less than a predetermined value, the REC extended control system 1 selects the CN. When the CN is selected, the respective REC devices 10-1 through 10-n and the extension REC device 10 are simultaneously connected to the CN side. Therefore, the respective REC devices 10-1 through 10-n and the extension REC device 10 preferably set two IP addresses as parameters, one for operation and the other one for non-operation, in advance.

More specifically, the maximum signal delay time that is allowed between a REC device and a RE by the REC extended control system 1 is defined as a specified value D1. A measured value of a signal delay time between the respective REC devices 10-1 through 10-n and the REs 20-1 through 20-n in a normal operation is defined as a measured value D2. Further, a measured value of a signal delay time between the extension REC device 10 and the REs 20-1 through 20-n when a new optical link for extension is used is defined as a measured value D3. A measured value of a signal delay time between the extension REC device 10 and the REs 20-1 through 20-n when the CN is used is defined as a measured value D4. Since the respective measured values D2 through D4 constantly vary depending on congestion levels of the networks N1 and N2, it is preferable to carry out measurement at predetermined time intervals.

In a normal operation, the respective REC devices 10-1 through 10-n are used, and therefore, the specified value D1 is greater than the measured value D2. Accordingly, the REC extended control system 1 selects the CN. In an extended operation using the extension REC device 10, on the other hand, the REC extended control system 1 selects the CN as usual, as long as the specified value D1 is greater than the measured value D4. If the specified value D1 is equal to or smaller than the measured value D4, however, the REC extended control system 1 selects the above described optical link for extension. In any case, the REC extended control system 1 is operated on the assumption that the specified value D1 is greater than the measured value D3.

As described above, the REC extended control system 1 includes the REC device 10-1 that communicates with the RE 20-1, and the extension REC device 10. The REC device 10-1 includes the switch instructing unit 15-1 and the extension signal processor 14-1. The switch instructing unit 15-1 monitors the state of the REC device 10-1, and, based on a result of the monitoring, determines switching from the REC device 10-1 to the extension REC device 10. When the switching is determined by the switch instructing unit 15-1, the extension signal processor 14-1 acquires (captures) a signal (the above described token signal) transmitted from the extension REC device 10, and requests the switching from the extension REC device 10. The extension REC device 10 includes the extension signal processor 14 and the digital processor 12. The extension signal processor 14 receives the switch request from the extension signal processor 14-1 of the REC device 10-1. In response to the switch request received by the extension signal processor 14, the digital processor 12 sets the parameters of the REC device 10-1 in the extension REC device 10, and establishes a CPRI link to the RE 20-1.

In the REC extended control system 1, when a malfunction or battery driving or resource shortage is detected from the REC device 10-1, the switch instructing unit 15-1 of the REC device 10-1 may determine the switching from the REC device 10-1 to the extension REC device 10. In the REC extended control system 1, when the REC device 10-1 recovers from a malfunction or battery driving or resource shortage, the switch instructing unit 15-1 of the REC device 10-1 determines switchback from the extension REC device 10 to the REC device 10-1. When the switch instructing unit 15-1 determines the switchback, the extension signal processor 14-1 of the REC device 10-1 requests the switchback from the extension REC device 10. In response to the switchback request from the REC device 10-1, the digital processor 12 of the extension REC device 10 may cancel the established CPRI link to the RE 20-1. In the REC extended control system 1, the REC device 10-1 may further include the digital processor 12-1 that transmits a request to the REC device 10-2 for handover of the mobile station 20 connected to the REC device 10-1 to the REC device 10-2 when battery driving or resource shortage is detected from the REC device 10-1.

In this structure, extension of a REC device can be realized, without a change in the existing physical interfaces. That is, when there is a malfunction in its own device, a battery is used for driving due to an electrical power failure or the like, or resource shortage occurs due to an increase in the number of users, each of the REC devices 10-1 through 10-n causes the extension REC device 10 in the higher-level CN to perform digital processing for them. With respect to the signal routes in doing so, CPRI signals that are transmitted and received between the REC devices 10-1 through 10-n and the REs 20-1 through 20-n are not subjected to digital processing that consumes a large amount of power in the REC devices 10-1 through 10-n as the start points of switching. The CPRI signals are relayed by the extension REC device 10 as the switching destination via the above described optical link for extension.

Alternatively, the REC devices 10-1 through 10-n as the start points of switching turn CPRI signals into IP packets (CPRI over Ethernet (a registered trade name)), and then transmit the CPRI signals to the extension REC device 10 via the existing CN. Accordingly, the extension REC device 10 can communicate with each of the REs 20-1 through 20-n. Alternate digital processing through the same device switching is possible not only by CPRI but also by OBSAI (Open Base Station Architecture Initiative). To monitor causes of switching such as a device malfunction, battery driving, and resource shortage, the control and management plane of a CPRI signal can also be used, for example.

As described above, the REC extended control system 1 has the extension REC device 10 in a higher-level network, and the REC devices 10-1, . . . , 10-n share the extension REC device 10. Accordingly, each of the REC devices 10-1, . . . , 10-n having simple structures can continue a communication without an increase in the device size even when a malfunction or the like occurs in its own device. Particularly, when a malfunction occurs, the REC extended control system 1 can recover in a short period of time at low costs and with a small amount of power consumption. When a battery is used for driving due to an electrical power failure or the like, the REC extended control system 1 can also recover in a short period of time. As a result, the service suspension time can be shortened.

In a case of resource shortage, each of the REC devices 10-1, . . . , 10-n are unable to cope with a sudden increase in the number of users. However, the REC extended control system 1 operates the extension REC device 10 in the widest band (an entire 20 MHz band, for example). Accordingly, even if each of the REC devices 10-1, . . . , 10-n is short of resources, resource extension can be performed in a short period of time.

In the above described embodiment, the REC extended control system 1 includes one extension REC device 10. However, two or more extension REC devices 10 may be included. Accordingly, the idle time of the extension REC devices 10 increases, and the REC extended control system 1 can cope with simultaneous malfunctions of the REC devices 10-a through 10-n. As a result, the REC extended control system 1 achieves higher reliability.

Furthermore, in the above described embodiment, each of the components of the REC extended control system 1 does not need to be physically formed as illustrated in the drawings. That is, specific examples of separation and integration of the respective devices are not limited to those illustrated in the drawings, but all of or some of the components may be functionally or physically divided or integrated in any units depending on various loads, usage conditions, and the like. For example, the resource information managing unit 13 and the extension signal processor 14 of the extension REC device 10, or the transmission path SW 11-1 and the coupler/transmission path SW 16-1 of the REC device 10-1 may be integrated as one component.

On the other hand, the extension signal processor 14-1 of the REC device 10-1 may be divided into a portion to acquire a signal (the token signal) transmitted from the extension REC device 10 when switching is determined, and a portion to request the switching from the extension REC device 10. Also, the digital processor 12 of the extension REC device 10 may be divided into a portion to set the parameters of the REC device 10-1 in the extension REC device 10 in response to the switch request from the REC device 10-1, and a portion to establish a CPRI link to the RE 20-1. Further, a memory that stores parameters and resource information may be connected as an external device to the extension REC device 10 or each of the REC devices 10-1 through 10-n via a network or a cable.

According to an embodiments, communications can be continued with a simple structure even when a malfunction has occurred in a device.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication control system comprising:
    a first communication control device that performs a communication with radio equipment; and
    a second communication control device, wherein
    the first communication control device includes:
        a transmission path switching unit that establishes a communication link between the first communication control device and the radio equipment;
        a determining unit that monitors a state of the first communication control device and determines switching from the first communication control device to the second communication control device based on a result of the monitoring; and
        a requesting unit that acquires a signal transmitted from the second communication control device and requests the switching to the second communication control device when the determining unit determines the switching,
    the second communication control device includes:
        a receiving unit that receives the switch request by the requesting unit of the first communication control device; and
        a controller that sets a parameter of the first communication control device to the second communication control device and establishes a link to the radio equipment in response to the switch request received by the receiving unit via the transmission path switching unit of the first communication control device.

2. The communication control system according to claim 1, wherein the determining unit of the first communication control device determines the switching from the first communication control device to the second communication control device when detecting a malfunction or battery driving or resource shortage in the first communication control device.

3. The communication control system according to claim 2, wherein
    the determining unit of the first communication control device determines switchback from the second communication control device to the first communication control device when the first communication control device recovers from the malfunction or battery driving or resource shortage,
    the requesting unit of the first communication control device requests the switchback to the second communication control device when the determining unit determines the switchback, and
    the controller of the second communication control device cancels the established link to the radio equipment in response to the switchback request from the first communication control device.

4. The communication control system according to claim 1, wherein the first communication control device further includes a transmitting unit that transmits a request to a third communication control device for handover of a mobile station connected to the first communication control device to the third communication control device when battery driving or resource shortage is detected in the first communication control device.

5. A communication control device that performs a communication with radio equipment, the communication control device comprising:
    a transmission path switching unit that establishes a communication link between the communication control device and the radio equipment;
    a determining unit that monitors a state of the communication control device and determines switching from the communication control device to another communication control device based on a result of the monitoring; and
    a requesting unit that acquires a signal transmitted from the another communication control device and requests the switching to the another communication control device when the determining unit determines the switching.

6. A communication control device that is connected, via a network, to another communication control device that performs a communication with radio equipment, the communication control device comprising:
    a receiving unit that receives a switch request transmitted from the another communication control device to the communication control device when switching from the another communication control device to the communication control device is determined in the another communication control device; and
    a controller that sets a parameter of the another communication control device to the communication control device and establishes a link to the radio equipment in response to the switch request received by the receiving unit via a transmission path switching unit of the another communication control device, wherein
    the another communication control device includes the transmission path switching unit that establishes a communication link between the another communication control device and the radio equipment.

7. A communication control method comprising:
establishing a communication link between a first communication control device and radio equipment by a transmission path switching unit of the first communication control device;
monitoring a state of the first communication control device and determining switching from the first communication control device to a second communication control device based on a result of the monitoring, by the first communication control device that performs a communication with the radio equipment;
acquiring a signal transmitted from the second communication control device and requesting the switching to the second communication control device when the switching is determined, by the first communication control device;
receiving the switch request by the first communication control device, by the second communication control device; and
setting a parameter of the first communication control device to the second communication control device and establishing a link to the radio equipment in response to the received switch request via the transmission path switching unit of the first communication control device, by the second communication control device.

* * * * *